United States Patent [19]

Marcade

[11] 4,195,232
[45] Mar. 25, 1980

[54] SELECTION ACKNOWLEDGEMENT SYSTEM FOR A LAUNDRY APPLIANCE

[75] Inventor: Roque D. Marcade, Stevensville, Mich.

[73] Assignee: Whirlpool Corporation, Benton Harbor, Mich.

[21] Appl. No.: 872,603

[22] Filed: Jan. 26, 1978

[51] Int. Cl.² .............................................. G08B 1/08
[52] U.S. Cl. ..................................... 307/130; 307/154
[58] Field of Search ..................... 307/141, 130, 154; 340/309.1, 309.3, 309.4

[56] References Cited

U.S. PATENT DOCUMENTS

| | | | |
|---|---|---|---|
| 3,986,040 | 10/1976 | Karklys | 307/141 |
| 4,001,599 | 1/1977 | Karklys | 307/141 |

Primary Examiner—L. T. Hix
Assistant Examiner—S. D. Schreyer
Attorney, Agent, or Firm—Hill, Van Santen, Steadman, Chiara & Simpson

[57] ABSTRACT

A selection acknowledgment system is disclosed for a laundry appliance having a plurality of function selection switches, a plurality of function indicator lights, and an integrated program chip which controls functions during operation of the laundry appliance. The program chip has a plurality of control lines each of which function as both an input and an output. During an input mode, signals generated by the function selection switches are input via the control lines. In an output mode, the same control lines convey output signals to trigger appropriate function indicator lights. In order to acknowledge operator actuation of one or more of the function selection switches during an input mode, an acknowledgment switching circuit is provided which momentarily turns off all of the function indicator lights as long as one of the function selection switches is depressed, thus indicating to the operator that the function he has selected has been entered into the program portion of the system.

14 Claims, 4 Drawing Figures

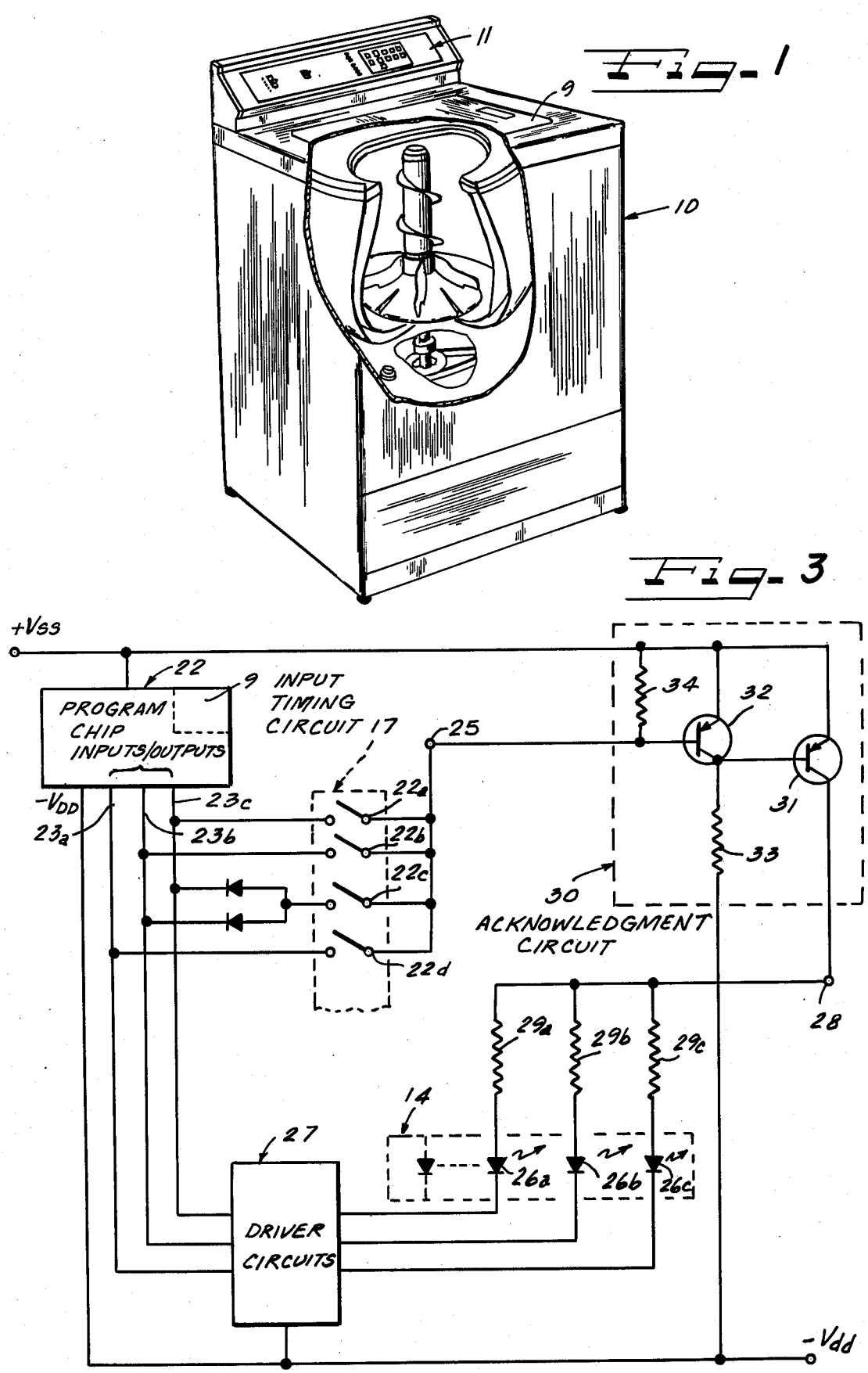

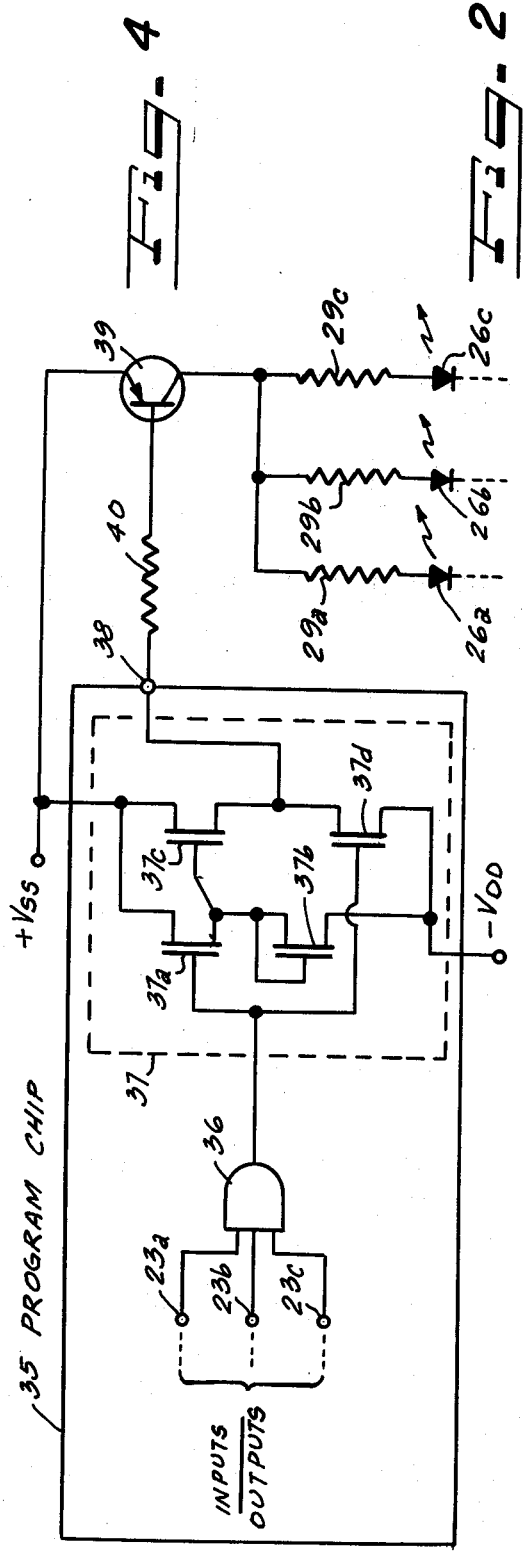
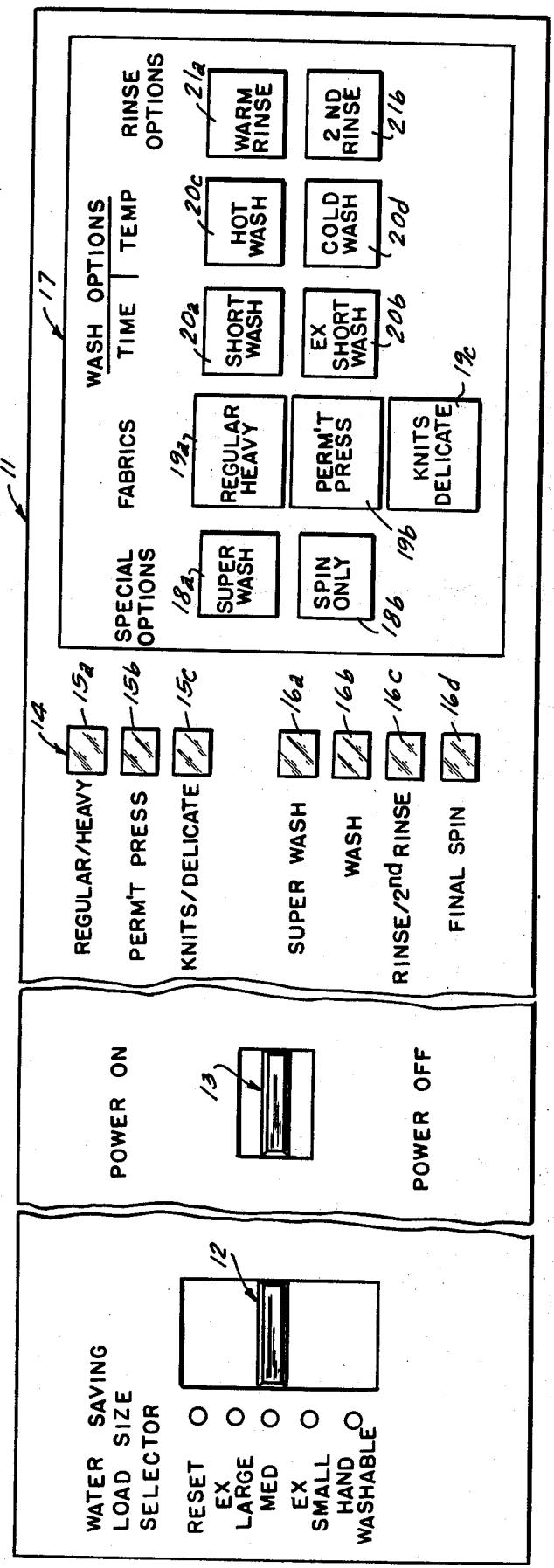

SELECTION ACKNOWLEDGEMENT SYSTEM FOR A LAUNDRY APPLIANCE

BACKGROUND OF THE INVENTION

1. Field of the Invention

This invention relates to a selection acknowledgment system for a laundry appliance containing programming circuitry.

2. Description of the Prior Art

It is known from U.S. Pat. No. 4,001,599, for example, to provide a programmable laundry appliance. A system is employed wherein function selector switches connect with input control lines of an input memory. The same control lines are also used as output lines for feeding a display amplifier and function display lights. Although the precise operation of the light system is not disclosed, a "clear" signal is entered into the memories when a switch is actuated to extinguish any indicator lights randomly lighted by start-up of the control memories.

During an initial input mode or cycle, the user actuates desired selection switches. In a similar programmable laundry appliance previously utilized by the assignee of the present invention, in an input mode all of the function display lights remain illuminated and the actuation by the user of one or more selection switches is not acknowledged. Only after the input cycle is completed after a predetermined time are the appropriate functional selections by the user properly indicated by the function display lights. Also, since the same control lines are used for both input and output, excessive supply current is required during the input cycle. This occurs since, not only the current for maintaining all of the function display lights in an on condition is required, but also current is utilized when one or more of the input switches is actuated.

SUMMARY OF THE INVENTION

It is an object of this invention to provide a selection acknowledgment system which will acknowledge to the operator during an input selection time period when the selections he has manually entered are electronically received by the machine.

It is a further object of this invention to reduce the power supply requirements for the control and acknowledgment system for the laundry appliance.

According to the invention, a plurality of function selection switches are provided which connect with respective control input lines of a program circuit which is preferably an integrated chip. The program circuit controls functions during operation of the laundry appliance in accordance with the commands entered via the selection switches. The control lines of the program circuit also connect with respective function indicator lights for indicating appropriate selected functions. By providing a timing circuit which switches the system from an input mode to an output mode, the same control lines perform both input and output functions. During an input mode, the control lines receive signals from the function selection switches. During an output mode occurring at a somewhat later time, the same control lines convey control signals for actuating appropriate function indicator lights. An acknowledgement switching circuit is connected between all of the function indicator lights and a source of D.C. voltage. An input control line for the switching circuit connects with all of the function selection switches.

During the input mode, all of the indicator lights are normally on since the switching circuit permits current flow from D.C. voltage through the indicator lights. However, when the user actuates one of the switches on a momentary contact basis, the switching circuit disconnects voltage to all of the indicator lights to cause extinguishment thereof. Consequently, as soon as the user makes a selection, all of the normally on function indicator lights are extinguished to indicate that a selection has been received at the control lines of the program circuit.

BRIEF DESCRIPTION OF THE DRAWINGS

FIG. 1 is a perspective view of a laundry appliance containing the selection acknowledgment system of this invention;

FIG. 2 is an expanded front view of the control panel on the laundry appliance of FIG. 1;

FIG. 3 is a schematic diagram of the selection acknowledgment system of this invention; and FIG. 4 is a schematic diagram of an alternate embodiment for a portion of the selection acknowledgment system of this invention.

DESCRIPTION OF THE PREFERRED EMBODIMENTS

A laundry appliance having the selection acknowledgment system of this invention is generally indicated at 10 in FIG. 1. A control panel 11 illustrated in greater detail in FIG. 2 is positioned to the rear of a loading and unloading door 9 of the machine.

Referring now to FIG. 2, the control panel 11 contains a water level selection switch 12, a power switch 13, a column 14 of function indicator lights, and a plurality of function selection switches generally designated 17. The function indicator lights in column 14 consist of indicators 15a through 15c for the indication of groups of machine functions called cycles. These cycles are appropriate for various fabrics, namely REGULAR/HEAVY, PERMANENT PRESS, and KNITS/DELICATE. The function indicator lights 14 also include four cycle function indicators 16a through 16d, namely; SUPER WASH, WASH, RINSE/2nd RINSE, and FINAL SPIN, which indicate the machine function within the cycle.

The function selection switches 17 include special option switches 18a (SUPER WASH) and 18b (SPIN ONLY); fabric selection switches 19a (REGULAR/HEAVY), 19b (PERM. PRESS), and 19c (KNITS/DELICATE); wash option switches 20a (SHORT WASH), 20b (EX SHORT WASH), 20c (HOT WASH), and 20d (COLD WASH); and finally rinse option switches 21a (WARM RINSE) and 21b (2nd RINSE).

According to the invention, overall operation of the machine proceeds as follows. First the user positions the load size selector 12 in accordance with the size of the wash load. This sets the water level in the machine. The user may then turn the machine on with power switch 13. When the machine is first turned on, an eight second input mode cycle or time period begins during which the operator selects one or more functions by pressing one or more of the function selection switches 17. Whenever one of the function selection switches is depressed, all of the indicator lights 14 which were previously on are extinguished as long as the function selection switch is held in a depressed condition. As soon as the switch is released, all the lights 14 return to an "on" condition. Consequently, the lights acknowledge that the machine program circuit has received the appropriate functional command entered by the user. If the user does not depress any of the function selector switches 17 during the initial eight second selection cycle, the machine automatically assumes a regular operational mode at the end of the eight second period. The REGULAR/HEAVY light 15a and the WASH light 16b will remain illuminated as the machine begins the washing function. The remainder of the indicator lights are extinguished. If the user enters a command before the initial eight second cycle has ended, a new eight second time period begins during which time the machine remains in the input mode.

Referring now to FIG. 3, one embodiment of the selection acknowledgment system of this invention is shown. An integrated circuit program chip 22 is provided which controls overall functioning of the machine in accordance with signals from the function selector switches 17. An input timing circuit 9 is provided within the chip 22 which establishes the eight second input mode cycle. Operation of this chip and one example of the circuitry useful therein, is disclosed in U.S. Pat. No. 4,001,599 previously discussed. The program chip 22 connects with a voltage source $+V_{ss}$ and also has a plurality of control lines 23a, 23b, 23c, etc. These control lines serve both for input signals and output signals to the program chip depending upon whether or not the chip is in an input mode in accordance with the the input timing circuit 9. The program chip also connects to a voltage source point $-V_{dd}$.

The function selection switches 17 are represented here with four switches 22a through 22d, it being understood that in correspondence with the panel shown in FIG. 2, eleven such switches could be utilized. Each of these switches 22a through 22d connect with respective control lines 23a through 23c. The other ends of the switches 22a through 22d are commonly connected at a point 25. When the switches are closed, they place a predetermined voltage on appropriate control lines which serve as an input signal to the program chip 22. In accordance with digital coding techniques, one of the switches 22c, for example, may place a signal both on a control line 23b and a control line 23c so as to simulate an overall input to the program chip of 1,0,0. Obviously, for additional function switches additional control lines are provided.

The control lines 23a through 23c also function as output lines and consequently connect through Darlington driver circuits 27 to respective indicator lights 26a through 26c which represent the indicator lights in column 14 of the control panel 11. The indicator lights are preferably light emitting diodes. Current limiting resistors 29a through 29c connected in series with the diodes 26a through 26c commonly connect at a voltage reference point 28.

An acknowledgement switching circuit 30 is provided having a first switching point connected to the D.C. supply $+V_{ss}$ and another switching point connected at the common connection point 28. The acknowledgment switching circuit 30 is controlled via a control line which connects to the common connection point 35 of the function selection switches 17. In this embodiment, the acknowledgment circuit 30 is formed of a PNP transistor 32 having its base connected to the point 35, its emitter connected to $+V_{ss}$, and its collector connected through a load resistor 33 to $-V_{dd}$. The base of a second PNP transistor 31 connects to the collector of the transistor 32. The emitter of transistor 31 connects to the emitter of transistor 32 and its collector connects to the common connection point 28.

Operation of the circuit shown in FIG. 3 will now be described first for the condition in which points 28 and 31 are directly connected to $+V_{ss}$ and the acknowledgment circuit 30 is not employed. Operation will then be described with the acknowledgment circuit 30 incorporated in the system.

Without the acknowledgment switching circuit 30, when the machine is first turned on and the eight second input mode cycle begins, all of the lights in column 14 are illuminated since the voltages present on the control lines 23a through 23c are such as to cause the driver circuits 27 to permit current to pass from $+V_{ss}$ through the lights in column 14 to $-V_{dd}$. When the user depresses one of the switches 22a through 22d on a momentary basis, an input signal is applied to the appropriate control line. However, this input circuit is insufficient to change operation of the driver circuits 27 and consequently all of the lights 14 remain illuminated and there is no acknowledgment to the user that he has made a selection and the machine control has received the selection.

When the acknowledgment circuit 30 is incorporated in the system of this invention, operation is as follows. As was the case above, when the machine is first turned on all of the lights in column 14 are illuminated. During this time, transistor 32 is normally off while transistor 31 is normally on. When the user makes his selection during the eight second mode cycle, the base of transistor 32 is pulled downwardly so as to turn that transistor on and transistor 31 off. Consequently, as long as one of the switches 17 is depressed, all of the lights 14 are extinguished since there is no current flow path through the transistor 31. This then acknowledges to the user that his selection has been received at the control line inputs of the program chip 22. As soon as the user releases the switch, transistor 31 again assumes an on condition and all of the lights are again illuminated. After an eight second selection cycle has elapsed without a further selection, the program chip 22 selectively illuminates one or more of the lights in column 14 in accordance with function selections made.

As noted earlier, with the invention, power supply requirements are less severe. Previously, since the lights in column 14 remained on during the eight second input mode cycle, current was necessary for maintaining all of the lights in an "on" condition. Also, if one or more selection switches 17 were activated, additional current was needed as a result of the closing of such selection switches 17. With the invention, however, since the lights 14 are extinguished at the same time that one of the selection switches 17 is closed, the only current requirement at such a point in time is that required for the closing of one of the switches 17. Consequently, the maximum current required during the input cycle mode is solely that required to maintain the indicator lights in an "on" condition.

Another embodiment of the invention is shown in FIG. 4 wherein a control line portion of the circuit may be incorporated in the same integrated circuit chip 35 as the program circuits. Here, the control lines 23a through 23c are connected to an AND gate 36. The function switches 17 are not shown here but connect to the control lines 23a through 23c as in FIG. 3. The output of the AND gate 36 connects to a buffer switching amplifier 37 comprised of P channel MOS field effect transistors 37a through 37d. These field effect transistors are connected for non-inverting operation for signals from the AND gate 36. Specifically, transistors 37a and 37b are series connected as are transistors 37c and 37d. These two series circuits are then paralleled with one another. The output of the AND gate 36 connects to the gates of transistors 37a and 37d. The gate of transistor 37b is shorted to its channel. One end of the channel of transistor 37a connects with the gate of transistor 37c. Output is taken from the junction between transistors 37c and 37d.

A display output pin 38 on the program chip 35 supplies the signal via a resistor 40 to the base of a transistor 39. The emitter of transistor 39 connects to $+V_{ss}$ and its collector commonly connects to all of the current limiting resistors 29a through 29c which provide a current flow path to each of the indicator lights 26a through 26c.

Operation of the circuit of FIG. 4 is as follows. Let us assume, for example, that the control lines 23a through 23c are all logic 1, negative logic in a low voltage state. Accordingly, the output of the AND gate 36 is low and the voltage at the output pin 38 is in a low voltage state. This turns transistors 39 on and all of the lights 26a through 26c will be on. If, however, one of the function switches 17 is momentarily closed raising the voltage on one of the control lines 23a through 23c to a logic 0, negative logic high voltage state, the output of the AND gate 36 will be high, the point 38 will be high, and the transistor 39 will be off. This extinguishes the lights 26a through 26c to acknowledge the momentary contact of one or more of the switches 17.

Although various minor modifications may be suggested by those versed in the art, it should be understood that I wish to embody within the scope of the patent warranted hereon, all such embodiments as reasonably and properly come within the scope of my contribution to the art.

I claim:

1. A selection acknowledgment system for a programmable laundry appliance having a plurality of user-selected functions and associated logic circuitry to implement said functions, said logic circuitry operating such that a delay of a fixed period exists between a time when a user selects and a time when said selected function is initiated by said appliance, said logic circuitry providing indication to the user that said selected function has been entered into the appliance program at the end of said fixed delay, said acknowledgment system comprising:
   a plurality of function selection switches;
   a plurality of normally on function indicator lights;
   program circuit means for controlling functions during operation of the laundry appliance, said program circuit means including a plurality of control lines, at least some of said control lines connecting both to a respective function selection switch and to a respective function indicator light; and
   acknowledgment switching means connected to said function selection switches and function indicator lights for immediately extinguishing said function indicator lights when one of said function selection switches is operated by a user, thereby immediately informing the user that a selected function has been entered into said program circuit means.

2. The system of claim 1 in which said acknowledgment switching means extinguishes said function indicator lights only during the time said function selection switches are closed.

3. The system of claim 1 in which said program circuit means includes timing circuit means for initiating indicator drive signals on selected control lines corresponding to programmed functions a predetermined time after an input signal has occurred on at least one control line.

4. A selection acknowledgment system for a programmable laundry appliance having a plurality of user-selected functions and associated logic circuitry to implement said functions, said logic circuitry operating such that a delay of a fixed period exists between a time when a user selects and a time when said selected function is initiated by said appliance, said logic circuitry providing indication to the user that said selected function has been entered into the appliance program at the end of said fixed delay, said acknowledgment system comprising:
   a plurality of function selection switches;
   a plurality of function indicator lights;
   program circuit means for controlling functions during operation of the laundry appliance, said program circuit means having control line means including a plurality of control lines for receiving inputs and transmitting outputs on the same control line, each of said control lines commonly connecting to a respective indicator light and function selection switch;
   a source of DC potential; and
   switching circuit means connected between the DC source and all of the indicator lights to normally illuminate said lights and having a control input connected to all of the selection switches, said switching circuit means immediately acknowledging to a user the closure of any one of the function selection switches by disconnecting power from the DC source to all of the indicator lights, thereby immediately informing the user that a selected function has been entered into said program circuit means.

5. The system of claim 4 in which the program circuit means includes a timing circuit means for indicator drive signals on selected control lines corresponding to programmed functions a predetermined time after an input signal has occurred on at least one control line.

6. The system of claim 4 in which drive circuits are connected between the program circuit means control lines and respective indicator lights.

7. The system of claim 4 in which said switching circuit means comprises a normally on transistor stage connected between the DC source and all the indicator lights, and a normally off transistor stage connected between all the function selector switches and an input to the normally on transistor stage, said normally on transistor stage turning off when one of said function selection switches is closed.

8. The system of claim 7 in which said normally off transistor stage is connected as a common emitter stage and said normally on transistor stage is a common emitter stage having its base connected to a collector of the normally off stage.

9. The system of claim 8 in which both transistor stages are PNP transistors.

10. The system of claim 4 in which said switching circuit means comprises a common emitter stage and the control input comprises an integrated circuit switching amplifier on an integrated chip which contains at least some of the program circuits, an AND gate also being provided between the control lines of the program circuit and the integrated circuit switching amplifier.

11. A selection acknowledgment system for a programmable laundry appliance having a plurality of user-selected functions and associated logic circuitry to implement said functions, said logic circuitry operating such that a delay of a fixed period exists between a time when a user selects and a time when said selected function is initiated by said appliance, said logic circuitry providing indication to the user that said selected function has been entered into the appliance program at the end of said fixed delay, said acknowledgment system comprising:

- a plurality of function selector switches connected in parallel at one end of a first common connecting point;
- a plurality of function indicator lights connected in parallel at one end at a second common connection point;
- a DC source terminal;
- a program circuit means for controlling functions during operation of the laundry appliance, said program circuit means including a plurality of control lines, each of said control lines connecting both to a respective other end of each of the function selector switches and also to a respective other end of each of said functions indicator lights; and
- an acknowledgment switching circuit having a first switching terminal connected to the DC source terminal, a second switching terminal connected to said second common connection point to normally illuminate said lights, and a control input connected to said first common connection point, whereby said acknowledgment switching circuit immediately extinguishes said plurality of function indicator lights upon actuation of one of the function selector switches thereby immediately informing the user that a selected function has been entered into said program circuit means.

12. The system of claim 11 in which the other ends of the indicator lights connect to the control lines via driver circuits and the one end of the indicator lights connect to the second common connection point via current limiting means.

13. The system of claim 11 in which said switching circuit comprises two series connected common emitter stages.

14. A function selection acknowledgment system for a programmable laundry appliance having a plurality of user-selected functions and associated logic circuitry to implement said functions, said logic circuitry including a flip-flop controlled by a delay circuit which resets said flip-flop after a fixed period has elapsed after selection of a function, said flip-flop upon being reset initiating undertaking of said function by said appliance, said logic circuitry providing indication to a user that said selected function has been entered into the appliance program at the end of said fixed period, said acknowledgment system comprising:

- a plurality of function selector switches connected in parallel at a first common connection point;
- a plurality of function indicator lights corresponding to respective function selector switches connected in parallel at a second common connection point;
- a DC source terminal;
- a program circuit connected to said DC source for controlling functions during operation of the laundry appliance, said program circuit including a plurality of control lines connecting both to terminals of said function indicator lights not connected at said second common connection point and to terminals of said function selector switches not connected at said first common connection point; and
- a switching circuit having a normally on transistor stage connected to said DC source and each function indicator light, and to an input from a normally off transistor stage connected to each function selector switch and to said DC source, whereby actuation of any function selector switch immediately turns said normally off transistor on which turns said normally on transistor off extinguishing all function indicator lights and immediately acknowledging to said user that said selected function has been entered in said program circuit.

* * * * *